United States Patent

[11] 3,610,964

[72] Inventors Iwao Hatano;
Katsumi Iwatani; Yasuhiko Tabata, all of Kyoto-fu, Japan
[21] Appl. No. 830,613
[22] Filed June 5, 1969
[45] Patented Oct. 5, 1971
[73] Assignee Omron Tateisi Electronics Co.
Kyoto-fu, Japan
[32] Priority June 8, 1968, June 8, 1968
[33] Japan
[31] 43/48334 and 43/48335

[54] FLIP-FLOP CIRCUIT
5 Claims, 3 Drawing Figs.

[52] U.S. Cl. 307/279, 307/214, 307/269, 307/289, 307/292, 328/63, 328/206, 328/209
[51] Int. Cl. H03k 3/26
[50] Field of Search 307/279, 289, 317, 214, 290, 291, 292, 269; 328/206, 209, 63, 72, 74, 179, 201

[56] References Cited
UNITED STATES PATENTS

| | | | |
|---|---|---|---|
| 3,003,069 | 10/1961 | Clapper | 307/289 |
| 3,086,127 | 4/1963 | Anderson | 307/289 X |
| 3,119,938 | 1/1964 | Metz | 307/317 X |
| 3,284,645 | 11/1966 | Eichelberger et al. | 307/289 X |
| 3,370,183 | 2/1968 | Turner | 328/206 X |
| 3,462,606 | 8/1969 | Case | 307/289 X |
| 3,510,849 | 5/1970 | Igarashi | 307/279 X |

FOREIGN PATENTS

| | | | |
|---|---|---|---|
| 1,162,875 | 2/1964 | Germany | 307/289 |

*Primary Examiner*—Stanley T. Krawczewicz
*Attorney*—Craig, Antonelli, Stewart & Hill

ABSTRACT: A dynamic-type flip-flop circuit having an output feedback means outside the circuit to obtain a characteristic of an R-S-type flip-flop circuit. The input is supplied to the input terminal through a diode.

INVENTORS
ISAO HATANO, KATSUMI IWATANI and
BY YASUHIKO TABATA
Craig, Antonelli, Stewart & Hill ATTORNEYS INVENTORS
ISAO HATANO, KATSUMI IWATANI and
BY YASUHIKO TABATA Craig, Antonelli, Stewart & Hill ATTORNEYS

FLIP-FLOP CIRCUIT

The present invention relates to a flip-flop circuit and more specifically to a flip-flop circuit having a required characteristic of an R–S-type flip-flop circuit by employing a dynamic-type flip-flop circuit.

As is well known, the R–S-type flip-flop circuit has a set output of "1" when only the set input is "1" and the flip-flop circuit maintains the set output even after the set input becomes "0." When the set input becomes "0" and further the reset input becomes "1," the set output becomes "0" and the reset output becomes "1." The reset output is maintained unchanged even in case the reset input becomes "0" unless the set input becomes "1."

This type of flip-flop circuit is expensive as compared with iith the dynamic-type flip-flop circuit and this is true especially in the case where the flip-flop circuit is constituted of an MOS integrated circuit.

The dynamic-type flip-flop circuit is simple in circuit construction and is less expensive as compared with the R–S-type flip-flop circuit. But, when the input becomes "1," the output becomes "1" on the strength of the subsequent clock pulse, and when the input becomes "0," the output becomes "0" on the strength of the subsequent clock pulse.

An object of the present invention is to provide a flip-flop circuit which is so constituted that the output is maintained as is, when the output becomes "1" on the strength of clock pulses after the input becomes "1," by employing a dynamic-type flip-flop circuit, and especially one formed as an MOS integrated circuit.

In order to accomplish the object of the present invention, an output feedback means is provided outside the dynamic-type flip-flop circuit. The feedback means may be either a diode or a resistor.

Thus, according to the present invention, the required characteristic of the R–S-type flip-flop circuit can be attained by employing an inexpensive dynamic-type flip-flop circuit. The present invention can be applied with ease to a dynamic-type flip-flop circuit constituted of MOS integrated circuits, which can be accomplished without change in internal connections.

Other objects and features of the present invention will be clarified in more detail in the following description and claims by referring to the accompanying drawings, in which;

Figure 1:
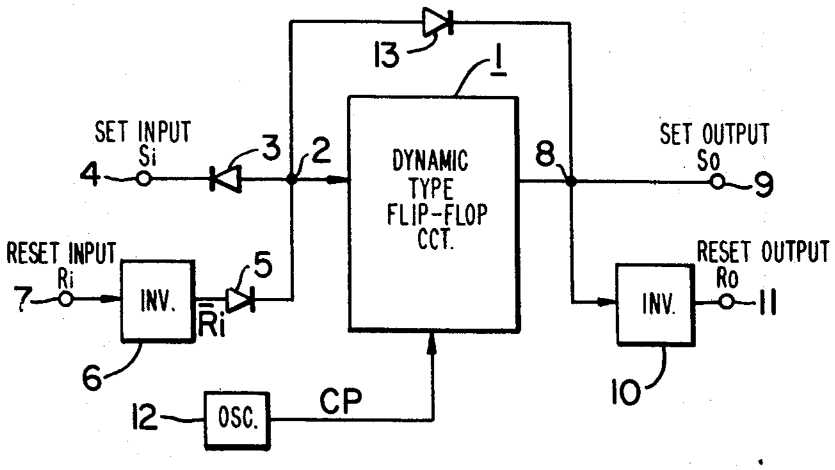
FIG. 1 shows a block diagram of an embodiment of the present invention.

Referring to FIG. 1, 1 denotes a dynamic-type flip-flop circuit and the input terminal 2 of the said circuit 1 is connected through a diode 3 to a set input 4. The polarity of the diode 3 is such that electrons flow in the direction from the input 4 to the input terminal 2. The input terminal 2 is also connected through a diode 5 and an inverter 6 to a reset input 7. The output terminal 8 of the circuit 1 is directly connected to a set output 9 and is also connected through an inverter circuit 10 to a reset output 11.

The circuit 1 is supplied with clock pulses generated by means of a clock pulse generator 12. A diode 13 is connected between the output terminal 8 and the input terminal 2 of the said flip-flop circuit 1 through a connection outside the said circuit 1 so that the diode may act to feedback the output from the output terminal 8 to the input terminal 2. The polarity of the diode 13 is such that electrons flow in the direction from the output terminal 8 to the input terminal 2.

Figure 2:
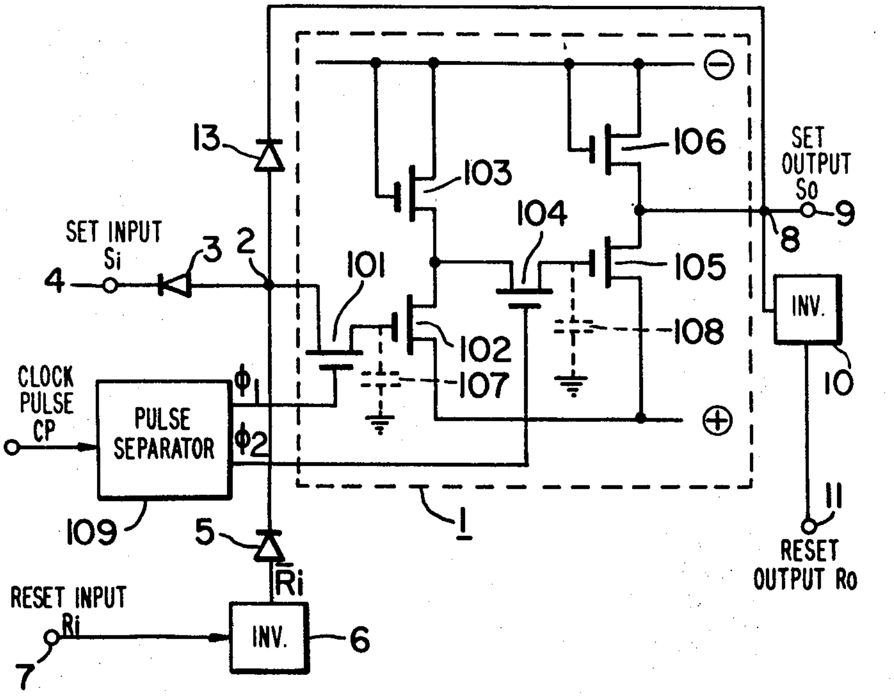
FIG. 2 shows a circuit diagram of the embodiment as shown in FIG. 1.

FIG. 2 illustrates a detailed connection of an example of the dynamic flip-flop circuit as shown in FIG. 1, 101 through 106 denote metal oxide semiconductor field effect transistors, which are shortly referred to as MOST throughout the present specification for simplicity.

The drain of MOST 101 is connected to the gate of MOST 102, the drain of which is connected to sources of MOST's 103 and 104 respectively. The drain of MOST 104 is connected to the gate of MOST 105, the drain of which is connected to the source of MOST 106. Sources of MOST's 102 and 105 are at a positive potential and gates and drains of MOST's 103 and 106 are at a negative potential. 107 denotes a capacitance which exists between the gate and source of MOST 102. 108 denotes a capacitance which exists between the gate and source of MOST 105. Clock pulses CP are separated by means of a pulse separator 109 into two series of pulses $\Phi_1$ and $\Phi_2$ so that both of them are generated alternately; the pulses $\Phi_1$ are fed to the gate of MOST 101 as read-in pulses and the pulses $\Phi_2$ are fed to the gate of MOST 104 as memory pulses.

The source of MOST 101 is connected to the input 2 and the drain of MOST 105 is connected to the output terminal 8. MOST's 103 and 106 are utilized as load MOST.

The operation of the invention will be explained hereinunder with reference to FIGS. 1 and 2.

In the following description, each of set input S*i*, reset input R*i*, set output S*o* and reset output R*o* when at a negative potential will be described as "1" based upon the negative logic. When the set input S*i* becomes "1," the input is read into the capacitance 107 on the strength of one of the read-in pulses $\Phi_1$ simultaneously occurring with "1" of the input S*i*, and is further transferred to the capacitance 108 on the strength of the subsequent first one of the memory pulses $\Phi_2$ and thus the set output S*o* becomes "1." This negative potential is fed back to the input terminal 2 through the diode 13. Thus, even in case the set input S*i* becomes "0," this positive potential is not applied to the input terminal 2 owing to the polarity of the diode 3, which does not pass current in the direction from the set input 4 to the input terminal 2, and the potential of the input terminal 2 is kept at a negative value unless the reset input R*i* becomes "1" and accordingly R*i* becomes "0."

This means that the set output S*o* is maintained at "1" irrespective of R*i* pulses $\Phi_1$ and $\Phi_2$ generated from the clock pulses CP. If the reset input R*i* becomes "1" in the above state, then $\overline{Ri}$ becomes "0" by means of the inverter 6, and this positive potential is applied to the input terminal 2 through the diode 5, at which time both the set input S*i* and the set output S*o* become "0" irrespective of the clock pulses. Thus, even in case the reset input R*i* becomes "0" and accordingly $\overline{Ri}$ becomes "1," this negative potential is not applied to the input terminal 2 owing to the polarity of the diode 5, which does not pass current in the direction from the inverter 6 to the input terminal 2, and the potential of the input terminal 2 is kept at a negative value unless the set input S*o* becomes "1." This means that the set output S*o* is maintained at "0" irrespective of the pulses $\Phi_1$ and $\Phi_2$ generated from the clock pulses CP.

Figure 3:
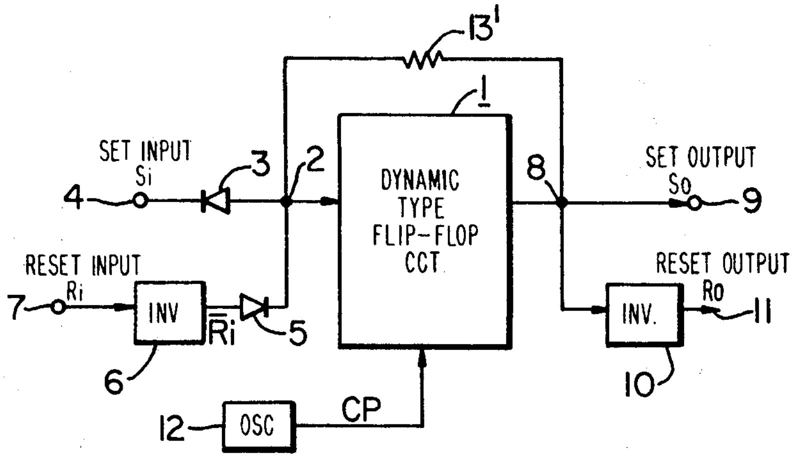
FIG. 3 shows a block diagram of another embodiment of the present invention.

Referring to FIG. 3, showing another embodiment of the present invention, a resistor 13′ is connected in place of the diode 13 as shown in FIG. 1.

The flip-flop circuit 1 in this case acts in the same way as that of shown in FIG. 1 and the detailed explanation is omitted.

In both FIG. 1 and FIG. 3, the feedback means such as the diode 13 and the resistor 13′ is connected by means of a connection outside the flip-flop circuit 1. This means that the feedback means can be provided with extreme ease even in case of an MOS integrated circuit, the internal connection of which cannot be changed.

What is claimed is:

1. A flip-flop circuit comprising a dynamic flip-flop circuit having set and trigger inputs and a set output, a source of clock pulses to trigger said dynamic flip-flop circuit connected to said trigger input, an input diode connected to said set input for supplying an input thereto, feedback means connected between said set input and said set output for effecting R–S-type flip-flop operation of said dynamic flip-flop circuit.

2. A flip-flop circuit according to claim 1 wherein said dynamic flip-flop circuit is constituted of an MOS integrated circuit.

3. A flip-flop circuit according to claim 1, wherein said feedback means is a feedback diode connected to said set input in the opposite direction of polarity to said input diode supplying said input to said set input.

4. A flip-flop circuit according to claim 1, wherein said feedback means is a resistor.

5. A flip-flop circuit according to claim 1, wherein said dynamic flip-flop circuit includes a reset input and an inverter connected to said reset input and to said set input through a further diode connected to said set input in the opposite direction of polarity to said input diode supplying said input to said set input.